Jan. 12, 1965   H. W. MADDEN   3,165,194
CAN ORIENTING MACHINE
Filed Feb. 20, 1963   4 Sheets-Sheet 2
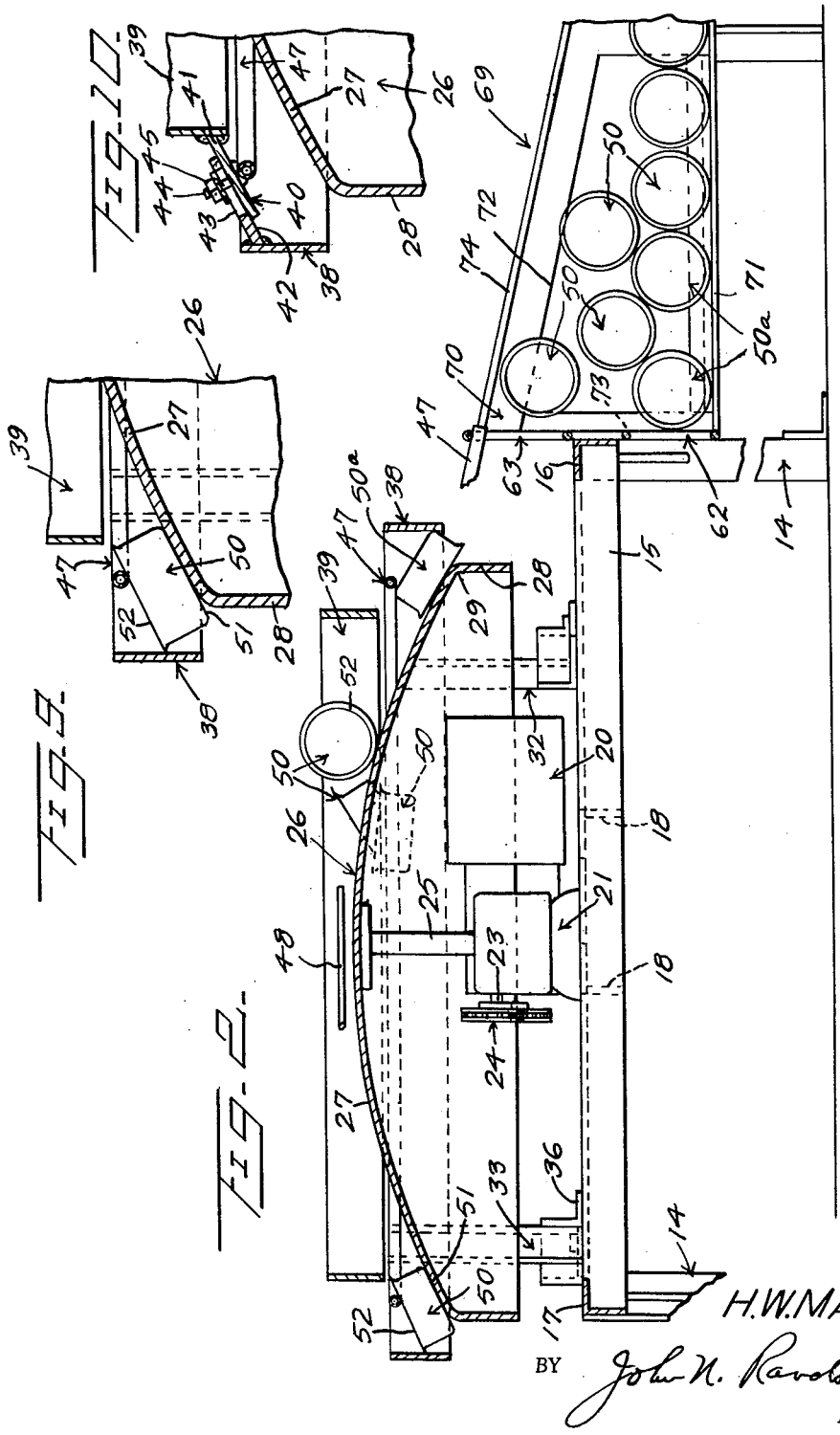
INVENTOR
H. W. MADDEN
BY John N. Randolph
ATTORNEY

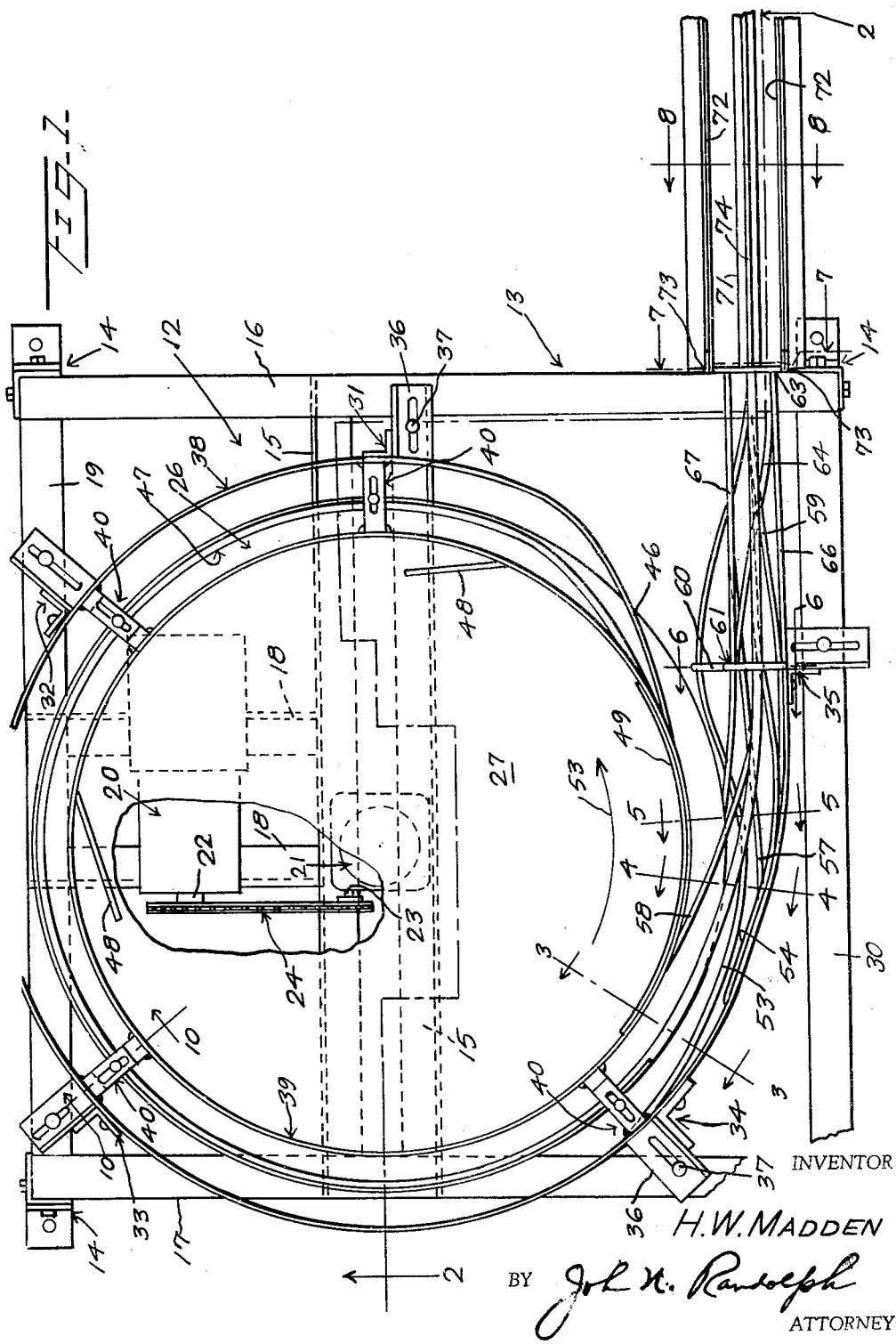

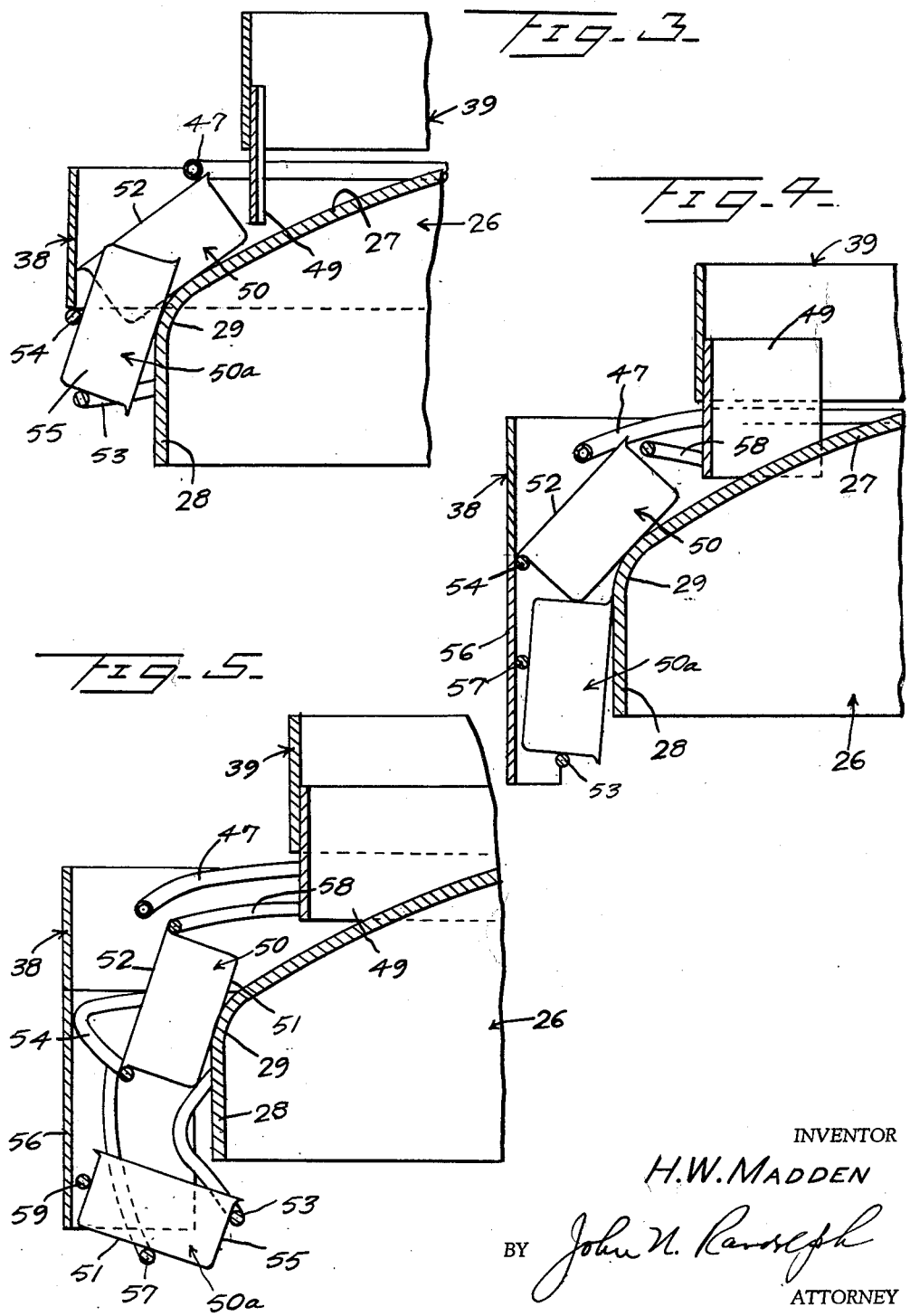

Jan. 12, 1965 H. W. MADDEN 3,165,194
CAN ORIENTING MACHINE
Filed Feb. 20, 1963 4 Sheets-Sheet 4
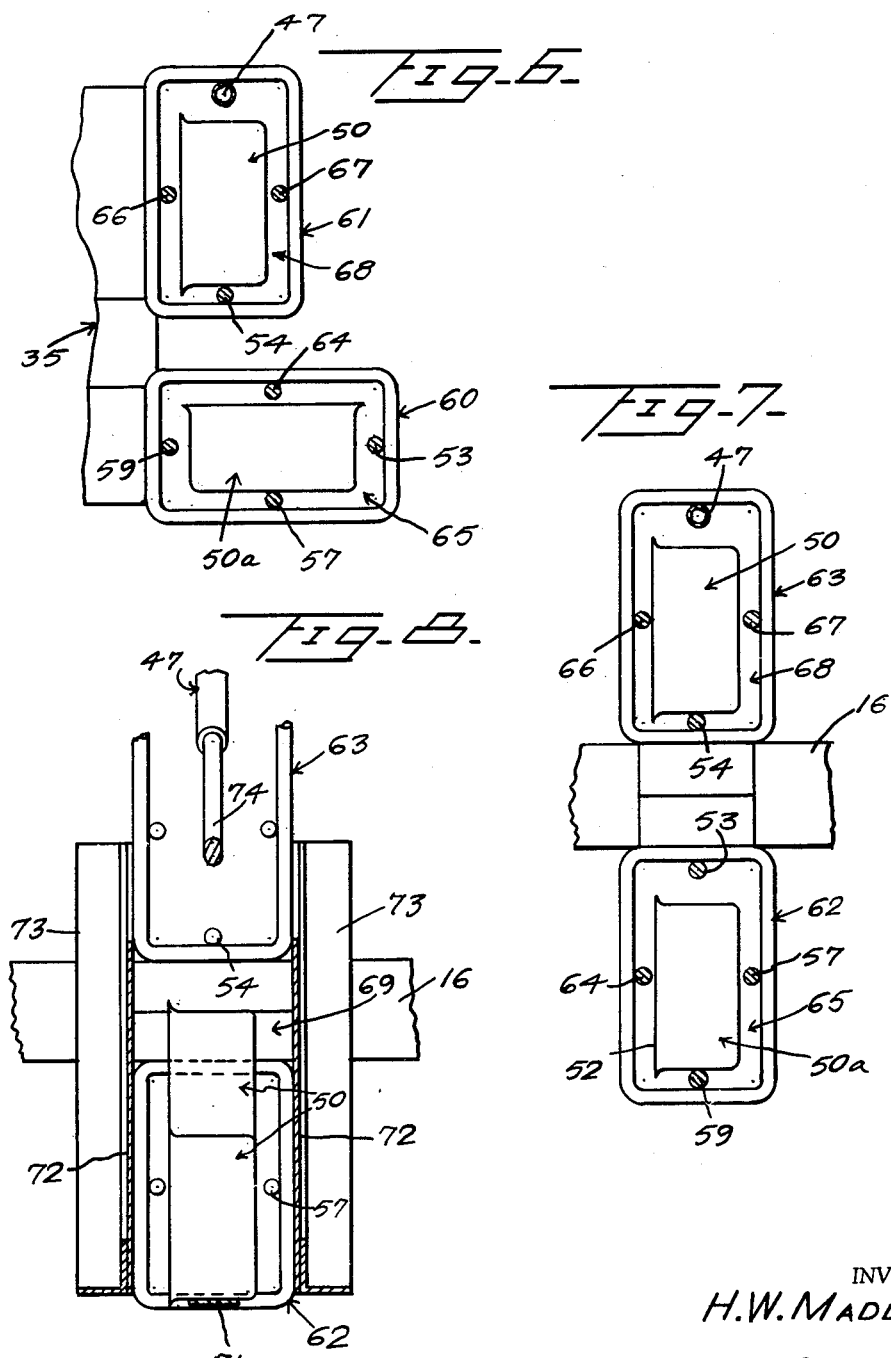
INVENTOR
H.W. MADDEN
BY John N. Randolph
ATTORNEY United States Patent Office 3,165,194
Patented Jan. 12, 1965

3,165,194
CAN ORIENTING MACHINE
Homer W. Madden, R.R. 3, Box 11A, Scottsburg, Ind.
Filed Feb. 20, 1963, Ser. No. 259,896
8 Claims. (Cl. 198—33)

This invention relates to a machine into which cans of a particular size may be dumped at random, and by means of which the cans will be automatically handled so as to be discharged from the machine with the open ends of all of the cans facing in the same direction, to facilitate subsequent operations such as filling, labeling, palletizing or otherwise handling the cans.

More particularly, it is an object of the present invention to provide a machine which is especially designed for handling shallow cans of the type in which certain food products, such as fish and meat, are conventionally packaged for the retail trade, and which cans are of a diameter greater than their height and have flared rims defining their open tops and which are of a larger diameter than the can bottoms.

Still another object of the invention is to provide a machine which is so constructed that the cans handled thereby will not be deformed, dented, scratched or otherwise damaged in any way.

Still a further object of the invention is to provide a machine having means for unstacking superimposed cans and for overturning upright cans to facilitate the escape of the cans from a hopper portion of the machine to a discharge chute of the machine.

Still another object of the invention is to provide a machine having separate discharge chutes one of which receives the cans which leave the hopper in inverted positions and in which the cans are overturned for orientation with cans conveyed through a second discharge chute and which have left the machine hopper in an upright position.

Still another object of the invention is to provide a machine which is so constructed as to utilize the dissimilarities in the diameters of the can bottoms and can tops to effect the direction of the cans into the separate discharge chutes of the machine whereby orientation of the cans is accomplished.

Various other objects and advantages of the invention will hereinafter become more fully apparent from the following description of the drawings, illustrating a presently preferred embodiment thereof, and wherein:

FIGURE 1 is a fragmentary top plan view, partly broken away, of the machine;

FIGURE 2 is a sectional view thereof taken substantially along the line 2—2 of FIGURE 1 and shown partly broken away;

FIGURES 3, 4, 5, 6, 7 and 8 are enlarged fragmentary transverse sectional views taken substantially along planes as indicated by the lines 3—3, 4—4, 5—5, 6—6, 7—7 and 8—8 respectively, of FIGURE 1;

FIGURE 9 is an enlarged fragmentary radial sectional view similar to a portion of FIGURE 2, and FIGURE 10 is an enlarged fragmentary radial sectional view taken substantially along a plane as indicated by the line 10—10 of FIGURE 1.

Referring more specifically to the drawings, the can orienting machine in its entirety is designated generally 12 and includes a substantially square frame 13 which is supported by depending corner legs 14. The frame 13 includes two adjacently disposed cross braces 15 which extend between the frame sides 16 and 17 and two braces 18 which extend between a side 19 of the frame 13 and the adjacent brace 15.

An electric motor 20 is supported on an secured to the braces 18 and a reduction gear unit 21 is supported on and secured to the braces 15. The drive shaft 22 of the motor 20 is connected to the input shaft 23 of the reduction gear unit 21 by a sprocket wheel and chain drive 24. The reduction gear unit 21 has a rotary driven upstanding output shaft 25 which is secured to the underside of the central portion of a turntable 26 for supporting said table for rotation with the shaft 25. The table 26 has a dome-shaped top portion 27, the upper side of which is convex and which terminates at its periphery in a depending cylindrical skirt 28 which is joined to the top portion 27 by a peripheral portion 29 which is rounded in cross section. The bottom edge of the skirt 28 is disposed above and spaced from the plane of the top surface of the frame 13. As seen in FIGURE 1, the gear reduction unit 21 is offset from the center of the frame 13 so that the turntable 26 is offset from the center of the frame and is disposed nearer to the frame sides 17 and 19 than to the two remaining frame sides 16 and 30, as best seen in FIGURE 1.

A post 31 is supported by and rises from one of the braces 15, adjacent the frame side 16. Two posts 32 and 33 are supported by and rise from the frame side 19. A post 34 is supported by and rises from the frame side 17, and a post 35 is supported by and rises from the frame side 30. Each of said posts has an elongated slotted foot member 36 which is attached to the frame by a fastening 37 through the slot thereof so that said post can be adjusted inwardly or outwardly of the frame.

A can retaining wall 38 in the form of a spiral strip is secured to each of the posts 31–35 and is supported thereby around the turntable 26, below the level of its top central portion and above the level of the skirt 28 and outwardly thereof.

A cylindrical wall 39 is disposed above and within the retaining wall 38 and is supported by braces 40 which extend between the walls 38 and 39 at the posts 31, 32, 33 and 34. As best seen in FIGURE 10, each brace 40 includes a bar 41 which is secured to and extends downwardly and outwardly from the wall 39, and a bar 42 which is secured to and extends upwardly and inwardly from the retaining wall 38 and which has an inner portion overlying a part of the bar 41 and which is provided with a longitudinal slot 43. A threaded stud 44 extends upwardly from the bar 41 through the slot 43 to receive a nut 45 by which the bars 41 and 42 are clamped together in selected adjusted positions. It will be noted that the cylindrical wall 39 is of smaller diameter than the turntable 26 and that its upper edge is disposed entirely above said turntable, while its lower edge is disposed below the level of the top central portion of the turntable but above and spaced from a part of the top portion 27 disposed directly therebeneath and which is located near the peripheral edge 29.

One end of the strip forming the retaining wall 38 is curved inwardly and upwardly, as seen at 46 and is secured to a portion of the outer side of the cylindrical wall 39, adjacent the post 35 and approximately midway between the posts 31 and 34. An elongated strand-like retaining element 47 has one end thereof secured to the cylindrical wall 39, between said wall and the end of the wall 38, which is secured to the wall 39. The element 47 extends counterclockwise, like the wall 38, from the cylindrical wall 39 and is connected to the undersides of the bars 41 of each of the braces 40, so as to be disposed between and substantially concentric to the walls 38 and 39, from the post 31 in a counterclockwise direction to the post 34. The retaining element 47, as seen in FIGURES 2, 9 and 10, is disposed below the level of the bottom edge of the wall 39 and has its under surface disposed slightly below the level of the upper edge of the outer wall 38. Said element 47 is illustrated as a tube but could constitute a rod.

The wall 39 is provided with two finger members 48 each of which is secured at one end thereof to the inner side of said wall and which finger members extend in diverging relation from the inner side of the wall and in a counterclockwise direction. The wall 39 is also provided with a depending strip 49 which is secured to its inner side and which extends downwardly therefrom so that its bottom edge terminates above and spaced from the portion of the table top 27 which is located directly therebeneath, as seen in FIGURES 3, 4 and 5. The length of the strip 49, which is located adjacent the frame side 30, is illustrated in FIGURE 1.

The wall 39 and the portion of the table top 27 surrounded thereby forms a hopper into which cans 50 are adapted to be dumped at random. The cans 50 are cylindrical and are of a diameter substantially greater than their height or depth as measured between the can bottoms 51 and the open tops of said cans as defined by their flared rims 52. Additionally, the flared rims 52 are of larger diameters than the bottoms 51, as clearly illustrated in the drawings. The diameters of the cans 50 are greater than the spacing between the bottom edge of the wall 39 and the part of the table top 27 disposed directly therebeneath, but said space is greater than the height of the cans as measured between the bottoms 51 and rims 52. As previously stated, the cans 50 are dumped at random onto the table top 27 and within the hopper wall 39. The table 26 revolves counterclockwise, as indicated by the arrow 53, and at a sufficient speed so that the cans 50 are urged outwardly of the table by centrifugal force. Those cans having their bottoms 51 or rims 52 resting upon the table top 27 will be urged outwardly by centrifugal force under the hopper wall 39, except the portion of said wall having the depending strip 49. Where cans are stacked one upon another or are on edge, as illustrated by three of the cans shown in FIGURE 2, such cans will be moved by centrifugal force into engagement with the hopper wall 39 and upon contacting one of the fingers 48 will be unstacked or overturned to assume positions with each can resting with either its rim or bottom upon the table top 27 so that these cans can then escape under the hopper wall 39. The cans 50 after passing outwardly under the wall 39 will move into engagement with the retaining wall 38 and the retaining element 47. Referring to FIGURE 2, an inverted can, designated generally 50a is shown at the right of the view with a portion of the peripheral edge of its bottom 51 engaging the retaining wall 38 and another portion of its bottom 51 engaging under the retaining element 47. Another can 50 is shown at the left of FIGURE 2 in an upright position after having escaped under the wall 39 and with a part of the rim 52 of this can engaging the wall 38 and other portions of the rim engaging under the retaining element 47, while the can bottom 51 rests upon a peripheral portion of the table top 27. Due to the larger diameter of the rim 52 as compared to the bottom 51, it will be noted that the can 50a is disposed at a lower level than the can 50, that its bottom 51 contacts the wall 38 at a lower position than the rim 52 of the can 50 contacts said wall, and that the retaining element 47 contacts the bottom 51 of the can 50a nearer its periphery than said retaining element contacts the rim 52 of the can 50. The cans 50 and 50a will travel counterclockwise around the wall 38 and retaining element 47 while in engagement therewith, due to their frictional contact with the table 26, and from adjacent the post 31 to and slightly beyond the post 34.

It will be noted that the retaining wall 38 diverges outwardly relative to the table 26 from the post 34 to the post 35, as best illustrated in FIGURE 1.

An end of a wire strand or rod 53 is secured to the bottom edge of the wall 38, adjacent the post 34, and extends in a counterclockwise direction therefrom downwardly and inwardly relative to said wall, as seen in FIGURES 1 and 3, and another wire 54 has an end connected to the bottom edge of the wall 38 between the post 34 and 35 and near said post 34 and which extends counterclockwise along said bottom edge. An inverted can 50a is shown in FIGURE 3 in advance of an upright can 50 and which cans have escaped from under the hopper wall 39. Due to the fact that the wall 38 has diverged slightly from the table 26 at the point of the section line 3—3 of FIGURE 1, the can 50a has slipped downwardly and out of engagement with the wall 38 and also from under and out of engagement with the retaining element 47, so that its cylindrical wall 55 is resting upon the wire 53 while parts of its rim 52 are engaging the rounded table portion 29. In this view the upright container 50 is still confined upon the table top 27 by engagement of its rim 52 with the wall 38 and element 47.

The wall 38 has a depending extension 56 which extends from the outer terminal end of said wall, located at the post 35, clockwise back toward the post 34 to a point between the section lines 3—3 and 4—4 of FIGURE 1, and as seen in FIGURE 4.

As seen in FIGURE 4, the wire 54 extends along the inner side of the upper edge of the wall extension 56 and an end of a wire 57 is fastened to the wall extension 56 below the wire 54, said end of the wire 57 being beveled where it merges with the inner side of the wall 56, as seen in FIGURE 1. Another wire 58 which is fastened at one end to the outer side of the wall extension 49 is flared outwardly toward the retaining element 47, which element 47 is inclined downwardly, from the post 34 toward the post 35, and away from the axis of the turntable 26. The can 50a in FIGURE 4 is substantially below the level thereof of FIGURE 3, due to the downward inclination of the wire 53 on which it rides, and said can is disposed between the skirt 28 and the wire 57. Due to the fact that the element 47 has diverged away from the wall 39 and table 26, at its position of FIGURE 4, the can 50 has slipped outwardly and downwardly so that a part of its flared rim 52 is engaging on the wire 54 while another part thereof is still bearing against the inner side of the element 47 and with the can bottom 51 still resting upon the rounded table portion 29.

At the position of FIGURE 5, the wires 53 and 57 have curved inwardly so that the can 50a is in nearly an upright position with its bottom 51 supported by the wire 57 and with its cylindrical wall confined between the wire 53 and a wire 59 which is secured to the wall extension 56, near the bottom edge thereof and which extends therefrom generally in the same direction as the aforementioned wires. The wire 54 is flared inwardly in FIGURE 5 toward the skirt 28 and away from the wall extension 56 which has diverged substantially from the skirt 28, and the can 50 is now supported on said wire 54 which still engages under its rim 52. The can 50 has moved out of engagement with the element 47, which has diverged away from the table 26, and another part of the rim thereof is engaging the outer side of the wire 58, which has converged toward the element 47, while the bottom 51 is still engaging a part of the table portion 29.

Two elongated rectangular frames 60 and 61 are secured to the inner side of the post 35, one above the other, with the upper frame 61 disposed in a vertical position and the lower frame in a horizontal position. Two rectangular frames 62 and 63 are secured to the frame side 16 substantially in alignment with the frames 60 and 61, respectively. The frame 62 extends downwardly from the frame side 16 while the frame 63 extends upwardly therefrom, and both of said frames are disposed in vertical positions. Referring to FIGURES 6 and 7, the wires 53, 57 and 59 extend through and are secured to the frames 60 and 62, and an additional wire 64 extends through and is secured to said frames and combines with the wires 53, 57 and 59 to provide a lower twisted chute 65 for cans 50a and which is twisted 90° between the frames 60 and 62, after having twisted 90° from the position of FIGURE 4 to the frame 60.

Accordingly, the cans 50a which are inverted on the table top 27 and which initially face inwardly toward the skirt 28 after disengaging the retaining wall 38, as seen in FIGURES 3 and 4, are turned through an arc of approximately 180° between the time said cans disengage the skirt 28 and pass through the frame 62, so that in passing through said frame 62 the rims 52 defining the open sides thereof are facing outwardly as seen in FIGURE 7 rather than inwardly, as seen in FIGURE 4.

Between the position of FIGURE 5 and the frame 61, the wire 58 merges with the element 47 and terminates, and the element 47 extends through the frames 61 and 63 and is secured to the tops thereof, while the wire 54 extends through and is secured to the bottoms of said frames. A wire 66 extends between and is secured to the left hand sides of the frames 60 and 63, as viewed in FIGURES 6 and 7, and a wire 67 extends between and is secured to the right hand sides of said frames 61 and 63. The wires 64 and 67 extend a short distance beyond the frames 60 and 61, to the left as seen in FIGURE 1, and merge with one another and terminate. The wires 54, 66 and 67 and the element 47 form an upper chute 68 which includes the frames 61 and 63 through which all of the cans 50, which are in upright positions when passing under the hopper wall 39, travel. Said cans 50 roll on the wire 54 after disengaging the revolving table 26 and until being discharged through the outlet end of the chute 68 as defined by the frame 63. Thus, as seen in FIGURE 7, where the discharge ends of the chutes 65 and 68, defined by the frames 62 and 63, respectively, are illustrated, the cans 50 and 50a are oriented so that the open sides of said cans are facing outwardly or to the left.

A passageway 69 has an entrance end 70 connected to the frames 62 and 63 and which includes a bottom strip 71 which extends outwardly from the bottom of the lower frame 62 and side walls 72 which are disposed in spaced apart relation to one another and which have downwardly inclined upper edges. The inner ends of said side walls 72 are secured to inner parallel flanges of upright angle members 73, as seen in FIGURE 8, and which straddle the frames 62 and 63 and which are secured to the outer side of the frame side 16. The passage 69 also includes a top portion defined by a wire 74 which extends downwardly at an incline from the end of the element 47 which is secured to the top of the upper frame 63. Thus, all of the cans 50 of the upper chute 68 and all of the cans 50a from the lower chute 65 discharge into the passageway 69. The cans 50a roll away from the lower chute 65 on the strip 71 while the cans 50 are discharged downwardly onto the cans 50a to work therebetween to form a single continuous flow line of oriented and integrated cans which can be carried by the passageway 69 to where the cans are to be subjected to processing such a filling, labeling, palletizing or the like.

It will thus be seen that so long as cans are fed at random onto the table top 27 through the hopper wall 39 and while said table top is revolving counterclockwise as viewed from above, that a substantially uniform flow of oriented cans will be supplied to and conveyed through the passage 69.

Various modifications and changes are contemplated and may be resorted to, without departing from the function or scope of the invention as hereinafter defined by the appended claims.

I claim as my invention:

1. A can orienting machine comprising a horizontally disposed table having a dome-shaped top and a depending cylindrical skirt, said table top being adapted to support cylindrical walled cans, a cylindrical wall concentrically disposed relative to the axis of said table and of a diameter less than the diameter of said skirt, said wall having a horizontal bottom edge spaced from the annular table top portion disposed directly therebeneath and combining therewith to provide a can passage, means revolving the table for propelling the cans by centrifugal force outwardly through the can passage, said can passage being of a size to allow movement of the cans therethrough only when in upright or inverted positions on the table top, a retaining wall disposed around and radially spaced outwardly from a substantial portion of said table top and adapted to be engaged by peripheral edges of the bottoms or rims of the cans which are conveyed outwardly through the can passage for maintaining said cans in positions resting on the table top for travel therewith partially around the retaining wall, said retaining wall including an end portion disposed in diverging relation to said cylindrical skirt and adapted to permit gravity escape of the cans between the retaining wall and table, a lower chute disposed along said divergent portion of the retaining wall and having an entrance end adapted to receive the inverted cans, an upper chute disposed above the lower chute having an entrance end disposed beyond the entrance end of the lower chute and adapted to receive the upright cans which are conveyed beyond the inverted cans by said table and while confined by engagement with the retaining wall, said lower chute having an exit end disposed directly beneath an exit end of the upper chute and being twisted through an arc of 180° between its ends whereby the cans are moving along the lower chute are adapted to be oriented to face in the same direction as the cans in the upper chute at the exit ends of the chutes.

2. A can orienting machine as in claim 1, and a retaining element disposed between said cylindrical wall and retaining wall and under which cans contacting the retaining wall are adapted to engage to prevent rocking movement of the cans relative to the table during movement of the cans along the retaining wall toward the divergent portion thereof.

3. A machine as in claim 1, said cylindrical wall having finger members projecting from an inner side thereof in a direction corresponding to the direction of rotation of the table and adapted to unstack superimposed cans and for overturning rolling cans.

4. A machine as in claim 1, and a single passageway leading from said chutes and having an entrance end into which the exit ends of both chutes open for merging the oriented cans into a single flow line.

5. A machine as in claim 1, a frame above which said table revolves, posts rising from said frame and secured to said retaining wall for supporting the retaining wall around the table, and braces extending between and secured to the cylindrical wall and retaining wall for supporting said cylindrical wall.

6. A can orienting machine comprising a table, means for revolving the table, a stationary cylindrical wall of a diameter less than the diameter of the table, said wall and table being disposed substantially concentric to one another, said wall having a bottom edge portion spaced above the table and forming therewith a can passage through which cans fed at random onto the table through said cylindrical wall are adapted to escape in either upright or inverted positions, said table having a downwardly curved peripheral portion disposed radially outward of said cylindrical wall, a retaining wall disposed around said table and radially spaced outwardly from said peripheral portion thereof and adapted to hold the cans escaping through said passage in engagement on said peripheral portion, means adapted to effect release of the cans from the retaining wall beyond the end of said passage toward which the cans are conveyed by the table, said means effecting release of the inverted cans at a position prior to release of the upright cans relative to said retaining wall, a lower chute having an entrance end disposed to receive the inverted cans and an exit end, an upper chute having an entrance end, spaced from the entrance end of the lower chute in a direction toward said exit end of the lower chute, for receiving the remaining cans, said upper chute having an exit end disposed above the exit end of the lower chute, and said lower chute being twisted between its entrance and exit ends through an arc of 180° for orienting the cans conveyed through said lower chute with the cans carried by the upper chute.

7. A can orienting machine comprising a hopper adapted to receive cans and including a stationary cylindrical wall and a revolving table disposed therebeneath, said wall having a bottom edge portion spaced from the table a distance such as to form a passage through which the cans are adapted to escape from the hopper when disposed with either the can bottoms or can rims resting on the table, said table having a peripheral portion which is downwardly curved radially and which is disposed outwardly of said hopper, means surrounding said peripheral portion and adapted to retain the cans thereon through a part of the circuit of travel of the cans with the table, a lower chute having an entrance end adapted to receive the inverted cans released by said means, said lower chute having an opposite exit end, an upper chute having an entrance end disposed between the ends of the lower chute and adapted to receive the upright cans released by said means at a point beyond the point of release of said inverted cans, said upper chute having an exit end disposed above the exit end of the lower chute, and said lower chute being twisted through an arc of 180° between its ends for orienting the cans conveyed through said lower chute with the cans carried by the upper chute.

8. A can orienting machine as in claim 7, a passage forming an extension of the exit ends of said chutes and having an entrance end communicating with both of said exit ends for merging the oriented cans into a single flow line.

References Cited by the Examiner

UNITED STATES PATENTS

| | | | |
|---|---|---|---|
| 1,290,055 | 1/19 | Biggs | 198—33.1 |
| 1,842,053 | 1/32 | Small | 198—30 |
| 1,972,489 | 9/34 | Rideout et al. | 198—30 X |
| 2,032,619 | 3/36 | Bounty | 198—33.1 |
| 2,271,997 | 2/42 | Chiappe | 198—33.1 |
| 2,665,005 | 1/54 | Mundy | 198—33.1 X |

SAMUEL F. COLEMAN, *Primary Examiner.*

WILLIAM B. LA BORDE, *Examiner.*